United States Patent [19]

Krawczyk et al.

[11] Patent Number: 5,529,324
[45] Date of Patent: Jun. 25, 1996

[54] SYSTEM AND METHOD FOR VEHICLE ROLL CONTROL

[75] Inventors: Gregory J. Krawczyk, Livonia; Alexander O. Gibson, Ann Arbor, both of Mich.

[73] Assignee: Kelsey-Hayes Company, Romulus, Mich.

[21] Appl. No.: 290,583

[22] Filed: Aug. 15, 1994

[51] Int. Cl.[6] .................................................. B60G 17/015
[52] U.S. Cl. ........................ 280/112.2; 280/772; 280/689
[58] Field of Search .................................. 280/112.2, 772, 280/702, 709, 707, 840, 689, 6.12, 714, 723; 267/64.16

[56] References Cited

U.S. PATENT DOCUMENTS

| | | | |
|---|---|---|---|
| 3,752,497 | 8/1973 | Enke et al. | |
| 3,820,812 | 6/1974 | Stubbs et al. | |
| 3,868,910 | 3/1975 | Schultz | 105/164 |
| 3,868,911 | 3/1975 | Schultz | 105/164 |
| 3,871,635 | 3/1975 | Unruh et al. | 267/11 |
| 3,885,809 | 5/1975 | Pitcher | 280/112 |
| 3,953,040 | 4/1976 | Unruh et al. | 280/6 |
| 4,206,935 | 6/1980 | Sheppard et al. | |
| 4,345,661 | 8/1982 | Nishikawa | |
| 4,589,678 | 5/1986 | Lund | |
| 4,624,476 | 11/1986 | Tanaka et al. | 280/707 |
| 4,669,749 | 6/1987 | Tanaka et al. | |
| 4,693,493 | 9/1987 | Ikemoto et al. | 280/707 |
| 4,697,237 | 9/1987 | Tanaka et al. | |
| 4,730,843 | 3/1988 | Tanaka et al. | |
| 4,765,649 | 8/1988 | Ikemoto et al. | 280/707 |
| 4,903,982 | 2/1990 | Harara et al. | 280/707 |
| 4,937,748 | 6/1990 | Yonekawa et al. | |
| 4,966,390 | 10/1990 | Lund et al. | 280/772 |
| 5,020,826 | 6/1991 | Stecklein et al. | 280/707 |
| 5,040,823 | 8/1991 | Lund | 280/772 |
| 5,106,120 | 4/1992 | Di Maria | 280/689 |
| 5,116,069 | 5/1992 | Miller | 280/112.2 |
| 5,161,822 | 11/1992 | Lund | 280/689 |
| 5,177,681 | 1/1993 | Sato | |
| 5,178,406 | 1/1993 | Reynolds | |
| 5,219,181 | 6/1993 | Lund | 280/772 |
| 5,230,529 | 7/1993 | Harvey-Bailey | 280/707 |
| 5,251,134 | 10/1993 | Takehara et al. | 364/424.05 |
| 5,251,136 | 10/1993 | Fukuyama et al. | 364/424.05 |
| 5,253,174 | 10/1993 | Inagaki et al. | 364/424.05 |
| 5,362,094 | 11/1994 | Jensen | 280/772 |

*Primary Examiner*—Robert J. Oberleitner
*Assistant Examiner*—C. T. Bartz
*Attorney, Agent, or Firm*—Brooks & Kushman

[57] ABSTRACT

A system and method for controlling vehicle roll, such as during a cornering maneuver. The roll control system and method include a sensor for sensing roll of the vehicle, a roll control signal generator for generating a roll control signal in response to the sensed vehicle roll, a pressure differential valve for generating a high pressure fluid, and an actuator for compensating for the sensed vehicle body roll. The roll control system and method also include a fluid control device for controlling the actuator in response to the roll control signal. The control device ports both the actuator inlet and outlet to a fluid reservoir when the vehicle is driven along a straight line path, and ports one of the actuator inlet and outlet to the fluid reservoir and the other of the actuator inlet and outlet to the high pressure fluid when the vehicle is driven along a curved path.

5 Claims, 3 Drawing Sheets

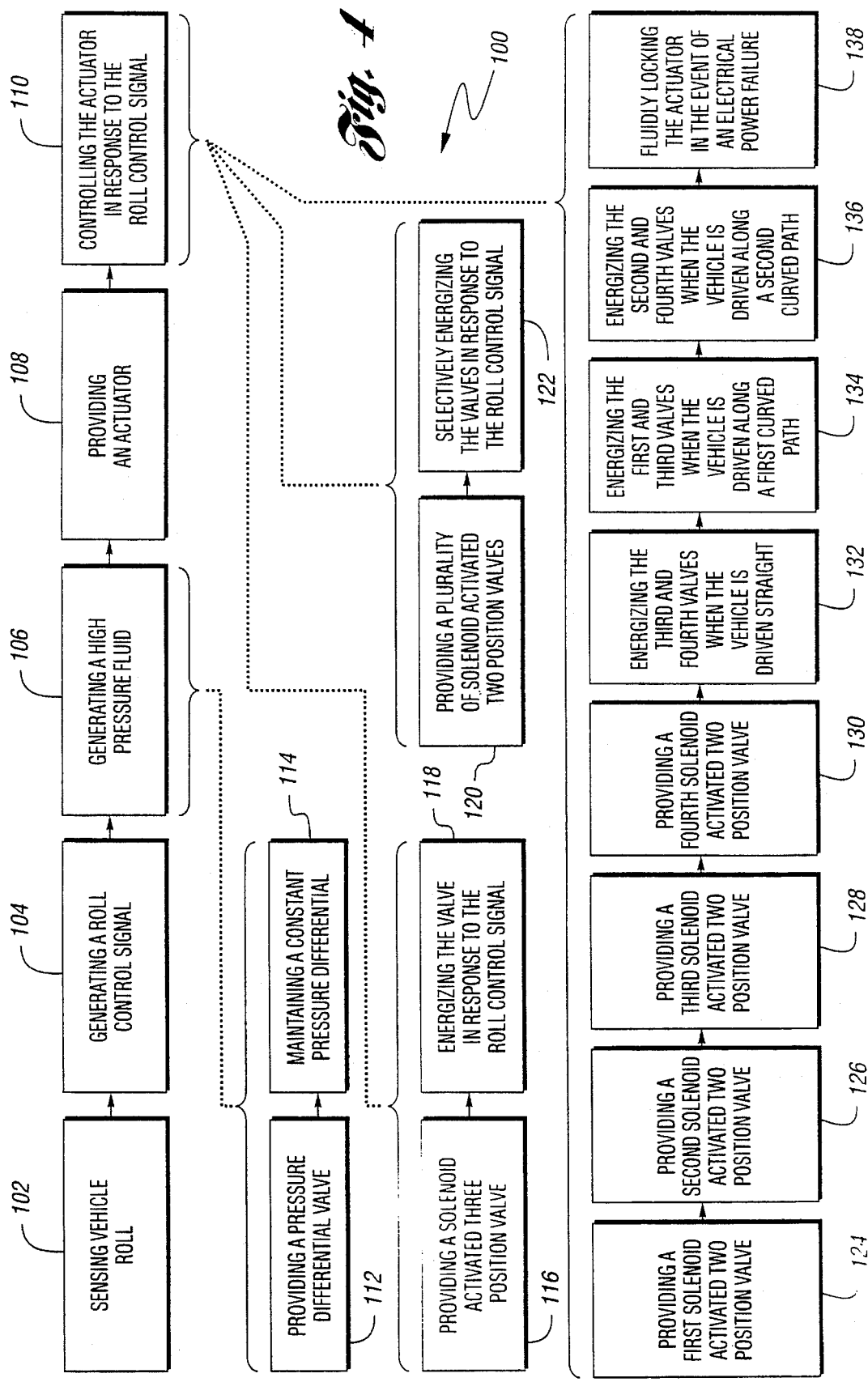

SYSTEM AND METHOD FOR VEHICLE ROLL CONTROL

TECHNICAL FIELD

This invention relates to a system and method for motor vehicle roll control.

BACKGROUND ART

Motor vehicle manufacturers today employ a variety of suspension systems for isolating the vehicle body from irregularities in the terrain over which the vehicle travels. Most such suspension systems may be categorized as either passive or active. Passive suspension systems typically react to forces via the inherent mechanical characteristics of a spring and damper combination connected between the vehicle body and wheels. Active suspension systems, in contrast, typically react to forces via electronic control of hydraulic or pneumatic fluid actuators normally connected between the vehicle body and wheels.

In addition to isolating the vehicle body from terrain irregularities, suspension systems have also been employed to stabilize the tendency of the vehicle body to tilt, or "roll," relative to the vehicle wheels during various vehicle maneuvers such as acceleration, deceleration, or cornering. U.S. Pat. No. 5,161,822 issued to Lund ("the Lund '822 patent") and U.S. Pat. No. 5,106,120 issued to Di Maria ("the Di Maria '120 patent") each disclose roll-control systems having a pair of hydraulic cylinder and piston assemblies connected between an anti-roll bar and an axle. The Lund '822 and Di Maria '120 patents thereby maintain the vehicle body in a substantially level position relative to the vehicle wheels, regardless of the force seeking to upset that position.

Nevertheless, vehicle suspension systems adapted for roll control still suffer from a variety of problems. First, as the vehicle is driven along a straight line path at a constant speed, the forces seeking to upset the level position of the vehicle body are generally negligible. However, if these forces become substantial, roll control systems would ideally permit fluid pressure therein to vary, or "float," so as not to interfere with the remaining portions of the vehicle suspension system working to isolate the vehicle body from terrain irregularities. However, the most actuators used in known roll control systems, such as the hydraulic cylinder and piston assemblies in the Lund '822 patent, are actively subjected to a fluid pressure at all times and are therefore unable to "float" as the vehicle is driven along a straight line path.

Moreover, roll control systems may include solenoid activated valves to control fluid pressure in the system actuators. Such valves have a de-energized position and at least one energized position, which are used to establish various fluid pressure levels in the system actuators depending upon the direction in which the vehicle is cornering. In the event of an electrical power failure, such roll control systems would ideally provide "firm" control, or a fluidly locked condition simulating a passive system. Under such circumstances, however, solenoid activated valves, shuttle to their de-energized positions, which permit fluid flow to and from the system actuators, as in the roll-control system of the Di Maria '120 patent. As a result, the active pressure control in the system actuators is lost and the roll control system "floats" rather than providing the "firm" control desired.

Thus, in addition to compensating for vehicle roll during cornering, an improved roll control system and method would provide "floating" roll control when the vehicle is driven along a straight line path, and "firm" roll control in the event of an electrical power failure. More specifically, an improved roll control system would be fluidly neutral when the vehicle is driven along a straight line path so as not to interfere with the remaining portions of the vehicle suspension system. Such a roll control system and method would also be fluidly locked in the event of an electrical power failure.

DISCLOSURE OF INVENTION

Accordingly, it is the principle object of the present invention to provide an improved system and method for vehicle roll control.

Another object of the present invention is to provide a system and method for vehicle roll control having fluidly neutral control when the vehicle is driven along a straight line path.

Another object of the present invention is to provide a system and method for vehicle roll control having fluidly locked control in the event of an electrical power failure.

According to the present invention, then, a system and method are provided for controlling vehicle roll. The roll control system of the present invention comprises means for sensing roll of the vehicle, means for generating a roll control signal in response to the sensed vehicle roll, a pressure differential valve for generating a high pressure fluid, and an actuator for compensating for the sensed vehicle roll, the actuator having a fluid inlet and a fluid outlet. The roll control system further comprises a fluid control device for controlling the actuator in response to the roll control signal, the control device operative to port both the actuator inlet and outlet to a fluid reservoir when the vehicle is driven along a straight line path, the fluid reservoir having a fluid pressure less than the high pressure fluid, and to port one of the actuator inlet and outlet to the fluid reservoir and the other of the actuator inlet and outlet to the high pressure fluid when the vehicle is driven along a curved path.

The roll control method of the present invention comprises sensing roll of the vehicle, generating a roll control signal in response to the sensed vehicle roll, generating a high pressure fluid, and providing an actuator for compensating for the sensed vehicle body roll, the actuator having a fluid inlet and a fluid outlet. The roll control method of the present invention further comprises controlling the actuator in response to the roll control signal to port both the actuator inlet and outlet to a fluid reservoir when the vehicle is driven along a straight line path, the fluid reservoir having a fluid pressure less than the high pressure fluid, and to port one of the actuator inlet and outlet to the fluid reservoir and the other of the actuator inlet and outlet to the high pressure fluid when the vehicle is driven along a curved path.

These and other objects, features and advantages will be readily apparent upon consideration of the following detailed description in conjunction with the accompanying drawings.

BRIEF DESCRIPTION OF DRAWINGS

FIG. 4 is block diagram of the method for vehicle roll control of the present invention.

BEST MODE FOR CARRYING OUT THE INVENTION

Figure 1:
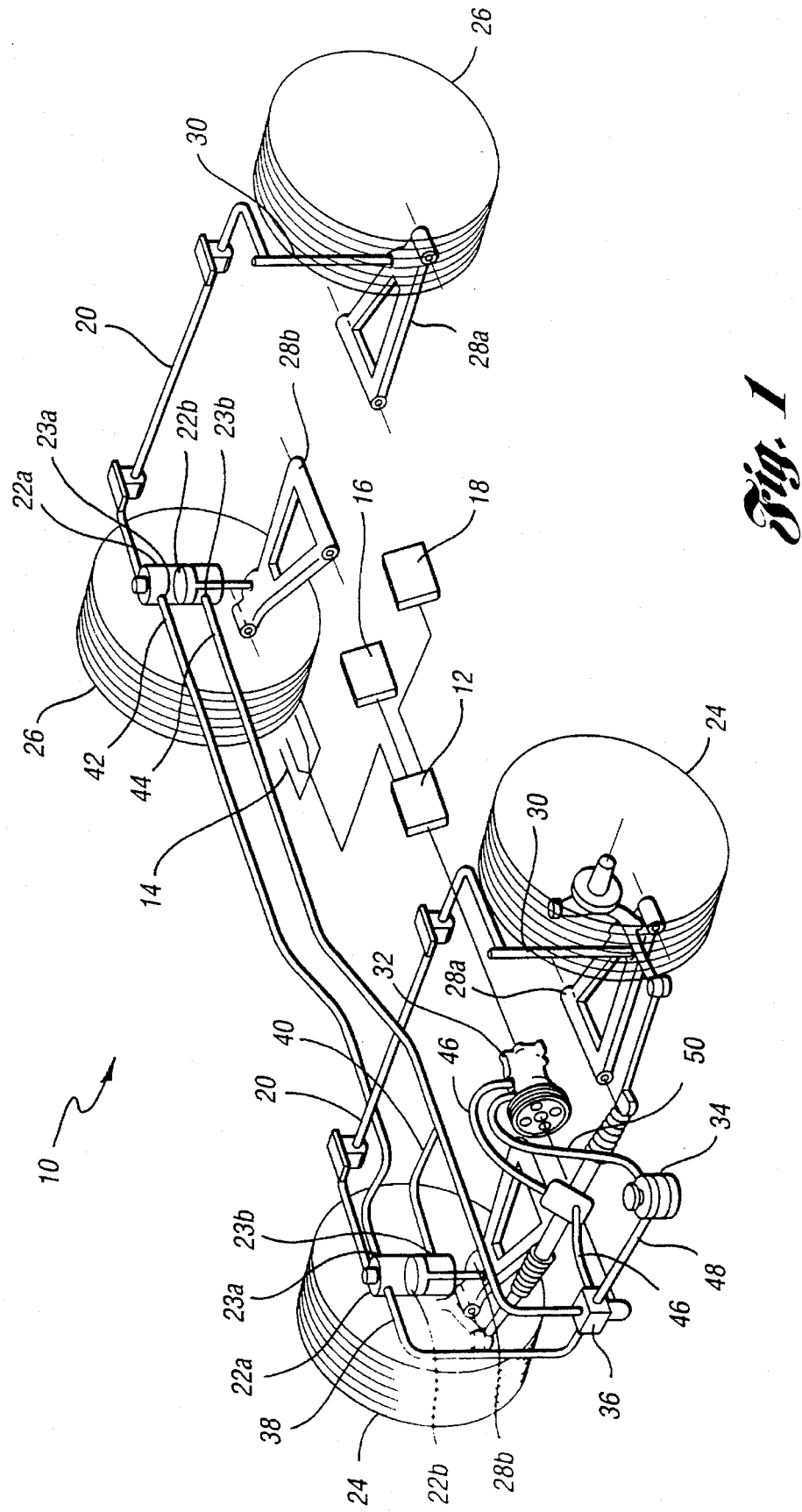
FIG. 1 is a perspective view of the system for vehicle roll control of the present invention.

With reference to the drawings, the preferred embodiments of the present invention will now be described. Referring first to FIG. 1, a perspective view of the system for vehicle roll control of the present invention is shown, designated generally by reference numeral 10. As seen therein, the roll control system (10) comprises an electronic control unit (ECU) (12) provided in electrical communication with at least one wheel speed sensor (14), a lateral accelerometer (16), and a steering angle detector (18).

Wheel speed sensors (14), lateral accelerometer (16), and steering angle detector (18) transmit input signals to ECU (12) representing vehicle wheel speed, lateral acceleration, and steering angle, respectively. ECU (12) processes these input signals to determine the degree of roll of the vehicle body relative to the vehicle wheels during various maneuvers such as cornering. Thus, as is readily apparent, ECU (12), wheel speed sensors (14), lateral accelerometer (16) and steering angle detector (18) together provide a means for sensing roll of the vehicle.

The roll control system (10) of the present invention also comprises an anti-roll bar (20) and a cylinder (22a) and piston (22b) assembly associated with a transverse pair of vehicle wheels, such as front wheels (24). Preferably, on a four-wheel vehicle, another anti-roll bar (20) and cylinder (22a) and piston (22b) assembly are similarly associated with rear wheels (26). Anti-roll bar (20) is connected to the vehicle body (not shown) and, via cylinder (22a) and piston (22b) assembly and a strut (30), to the vehicle wheels at a pair of suspension arms (28a, 28b) also associated with the particular vehicle wheel pair (24, 26).

More specifically, one end of anti-roll bar (20) is connected to a rigid strut (30), which is in turn connected to one of the suspension arms (28a). The other end of anti-roll bar (20) is connected to the cylinder (22a) and piston (22b) assembly at cylinder (22a), while piston (22b) is in turn connected to the other suspension arm (28b). As a result, on the side of the vehicle having rigid strut (30), the roll control system (10) of the present invention provides a reference for actuation of the cylinder (22a) and piston (22b) assembly on the other side of the vehicle.

The cylinder (22a) and piston (22b) assembly is part of a fluid, preferably hydraulic, circuit which further comprises a fluid pump (32), a fluid reservoir (34) and a fluid control device (36). In this regard, cylinder (22a) is provided with at least one port (23a) on one side of piston (22b), and at least one port (23b) on the other side of piston (22b). Ports (23a, 23b) are provided for intake and exhaust of a working fluid such that piston (22b) may be translated axially in cylinder (22a). As a result, on this side of the vehicle, as will be discussed in greater detail below, the roll control system (10) of the present invention provides for inputting a torque through anti-roll bar (20) to cancel vehicle handling induced torques. From the foregoing, it is readily apparent that anti-roll bar (20), cylinder (22a) and piston (22b) assembly, and strut (30) together provide an actuator for compensating for the sensed vehicle roll.

Still referring to FIG. 1, ECU (12) is also provided in electrical communication with fluid control device (36), which is fluidly connected by a plurality of conduits (38, 40, 42, 44, 46, 48) to each cylinder (22a) and piston (22b) assembly, fluid pump (32) and fluid reservoir (34). Another conduit (50) also fluidly connects fluid pump (32) to fluid reservoir (34) to complete the fluid circuit. This fluid circuit may be a part of the power steering system wherein fluid pump (32) may be the vehicle power steering pump or a dedicated pump. Alternatively, fluid pump (32) and the fluid circuit described may be an independent system.

As previously described, ECU (12) receives input signals from wheel speed sensors (14), lateral accelerometer (16) and steering angle detector (18) for processing to determine the roll of the vehicle body relative to the vehicle wheels. Based upon that determination, ECU (12) transmits a roll control signal to fluid control device (36). In response to that roll control signal, fluid control device (36) operates to control cylinder (22a) and piston (22b) assemblies and anti-roll bars (20) so as to compensate for the sensed roll of the vehicle body relative to the vehicle wheels. ECU (12) thus provides a means for generating a roll control signal in response to the sensed vehicle roll.

In that regard, and as will be described in greater detail below, as the vehicle is driven along a curved path in a direction toward that side of the vehicle where cylinder (22a) and piston (22b) assemblies are located, the vehicle body will tend to roll relative to the vehicle wheels in the opposite direction, that is, away from that side of the vehicle where cylinder (22a) and piston (22b) assemblies are located. In that event, cylinder (22a) and piston (22b) assemblies are controlled so as to provide a torque to anti-roll bar (20) in opposition to the cornering induced torque in order to right the vehicle body relative to the vehicle wheels. This is accomplished by supplying fluid to cylinders (22a) on one side of pistons (22b) through ports (23b), and exhausting fluid from cylinders (22a) on the other side of pistons (22b) through ports (23a).

Similarly, as the vehicle is driven along a curved path in a direction away from that side of the vehicle where cylinder (22a) and piston (22b) assemblies are located, the vehicle body will tend to roll relative to the vehicle wheels in the opposite direction, that is, toward that side of the vehicle where cylinder (22a) and piston (22b) assemblies are located. In that event, cylinder (22a) and piston (22b) assemblies are controlled so as to cancel the cornering induced torque and right the vehicle body relative to the vehicle wheels by applying an opposing torque through anti-roll bar (20). This is accomplished by supplying fluid to cylinders (22a) on one side of pistons (22b) through ports (23a), and exhausting fluid from cylinders (22a) on the other side of pistons (22b) through ports (23b).

Figure 2:
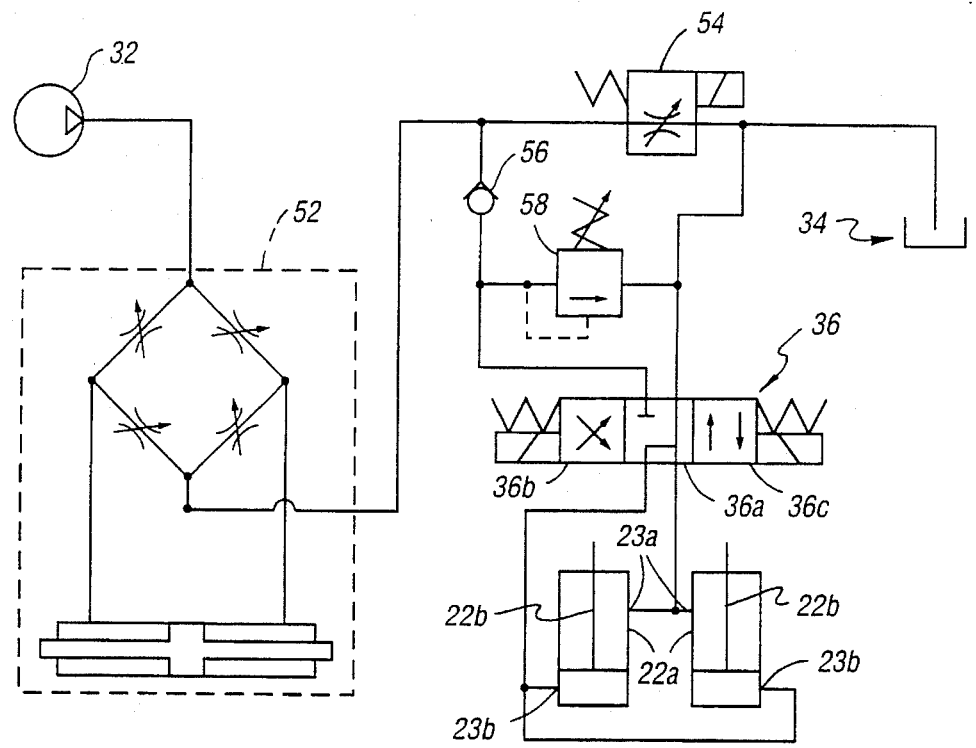
FIG. 2 is a fluid schematic of the system for vehicle roll control of the present invention.

Referring now to FIG. 2, a fluid schematic of the system (10) for vehicle roll control of the present invention is shown, wherein components first identified in FIG. 1 have been assigned like reference numerals. As seen therein, the fluid circuit previously described is a part of the power steering system and comprises power steering fluid pump (32) which feeds a power steering valve assembly (52). Power steering valve assembly (52) is also connected to a pressure differential valve (54), which in turn is connected to fluid reservoir (34).

The fluid circuit also comprises a check valve (56) also connected to the power steering valve assembly (52), and a relief valve (58) connected to both the check valve (56) and fluid reservoir (34). Fluid circuit further comprises fluid control device (36), which may comprise a solenoid activated, three-position, four-way valve. More specifically, as seen in FIG. 2, fluid control device (36) has a de-energized position (36a), a first energized position (36b) and a second energized position (36c).

A first fluid line from fluid control device (36) is connected between check valve (56) and relief valve (58), while a second fluid line is connected to fluid reservoir (34). Additionally, a third fluid line from fluid control device (36) is connected to cylinders (22a) at ports (23a) on one side of pistons (22b), while a fourth fluid line from fluid control device (36) is connected to cylinders (22a) at ports (23b) on the other side of pistons (22b). As previously shown and described with reference to FIG. 1, pistons (22b) are themselves connected to anti-roll bars (20). Similarly, as also shown and described with reference to FIG. 1, fluid reservoir (34) is also connected directly to power steering fluid pump (32).

Referring again to FIG. 2, the operation of the fluid schematic components identified above will now be described. In that regard, power steering fluid pump (32) feeds fluid through power steering valve assembly (52) to pressure differential valve (54) which is preferably provided as specifically disclosed in a co-pending application 08/290,692, incorporated herein by reference, filed the same day and assigned to the same assignee as the present application. Generally, however, pressure differential valve (54) is a proportional solenoid activated valve capable of establishing pressure differentials up to 800 psi across its input and output in response to control signals received from ECU (12), shown in FIG. 1. Pressure differential valve (54) is further capable of maintaining the required pressure differential regardless of the rate of fluid flow from power steering fluid pump (32). Thus, as is readily apparent, pressure differential valve (54) generates a high pressure fluid for use in the roll control system (10) of the present invention.

When the vehicle is driven along a straight line path, the sensed roll of the vehicle body relative to the vehicle wheels is negligible. As a result, pressure differential valve (54) will be de-energized so that only a negligible pressure differential (on the order of 10 psi) will be set up thereacross. Similarly, fluid control device (36) will also be de-energized. In its de-energized position (36a), fluid control device (36) connects ports (23a, 23b) on both sides of pistons (22b) directly to fluid reservoir (34). As a result, the fluid pressure in cylinders (22a) on each side of pistons (22b) will approach an equilibrium substantially at the pressure of the fluid in fluid reservoir (34).

In such a fashion, as terrain irregularities are encountered by the vehicle, pistons (22b) passively "float" relative to cylinders (22a) and their associated anti-roll bars (20) (see FIG. 1). Thus, as the vehicle is driven along a straight line path, it is provided with fluidly neutral roll control that does not to interfere with the remaining portions of the vehicle suspension system working to isolate the vehicle body from terrain irregularities.

Still referring to FIG. 2, when the vehicle is driven along a curved path and roll of the vehicle body is sensed relative to the vehicle wheels, pressure differential valve (54) is energized in order to establish a pressure differential thereacross such that a relatively lower fluid pressure exists on that side of pressure differential valve (54) connected to fluid reservoir (34). The magnitude of the pressure differential established by pressure differential valve (54) is directly proportional to the severity of the degree of roll of the vehicle body sensed. That is, the greater the roll of the vehicle body relative to the vehicle wheels, such as in a hard cornering maneuver, the greater the fluid pressure that is necessary in cylinder (22a) and piston (22b) assemblies to counteract such roll.

At the same time pressure differential valve (54) is energized, fluid control valve (36) is also energized and thereby shuttled to one of the two energized positions (36b, 36c), depending upon the direction of the curved path along which the vehicle is driven. In that regard, one of the two energized positions (36b, 36c) is operative to provide a clockwise torque to anti-roll bar (20) to right the vehicle body relative to the vehicle wheels on that side of the vehicle where the cylinder (22a) and piston (22b) assemblies are located (see FIG. 1). Similarly, the other of the two energized positions (36b, 36c) is operative to provide a counter-clockwise torque to anti-roll bar (20) to right the vehicle body relative to the vehicle wheels on that side of the vehicle where the cylinder (22a) and piston (22b) assemblies are located (see FIG. 1).

For example, when fluid control device (36) is shuttled to energized position (36b), high pressure fluid generated by pressure differential valve (54) flows through check valve (56) into cylinders (22a) through ports (23a) thereby increasing fluid pressure on one side of pistons (22b). As a result, fluid is forced out of cylinders (22a) through ports (23b) into fluid reservoir (34). In such a fashion, depending upon the configuration of the roll control system (10) and the direction of the curved path along which the vehicle is driven, a torque is applied to anti-roll bar (20) in opposition to the cornering induced torque so as to right the vehicle body relative to the vehicle wheels.

When fluid control device (36) is shuttled to energized position (36c), a similar but opposite result is reached. That is, if a clockwise torque is applied to anti-roll bar (20) when fluid control device (36) is shuttled to energized position (36b), then a counter-clockwise torque is applied to anti-roll bar (20) when fluid control device (36) is shuttled to energized position (36c). Similarly, if a counter-clockwise torque is applied to anti-roll bar (20) when fluid control device (36) is shuttled to energized position (36b), then a clockwise torque is applied to anti-roll bar (20) when fluid control device (36) is shuttled to energized position (36c).

Referring still to FIG. 2, check valve (56) is provided to prevent fluid flow from fluid control device (36) and cylinder (22a) and piston (22b) assemblies to power steering valve assembly (52). That is, check valve (56) protects power steering valve assembly (52) from high fluid pressures that may be developed in cylinder (22a) and piston (22b) assemblies, such as where terrain irregularities are encountered when the vehicle is driven along a curved path, which exceed the pressure tolerance of power steering valve assembly (52).

Similarly, relief valve (58) also operates, in part, to protect power steering valve assembly (52) from excessive fluid pressures that may develop in the roll control system (10) of the present invention. Relief valve (58) also operates to protect the components of the roll control system (10) itself, such as cylinder (22a) and piston (22b) assemblies, from excessive fluid pressures that may be generated due to excessive terrain irregularities.

As seen in FIG. 2, relief valve (58) is preferably an ordinary spring biased, normally closed valve. When fluid pressure increases to a level where the force exerted on the valve by the fluid exceeds the tension force of the spring, relief valve (58) opens to bleed fluid to fluid reservoir (34). In that regard, the spring tension force of relief valve (58) is adjustable so that the fluid pressure at which relief valve (58) will open may be varied. Preferably, the spring tension force of relief valve (58) is set such that fluid pressure in the roll control system of the present invention will not exceed a pre-determined maximum safe system pressure, preferably approximately 700 psi.

Figure 3:
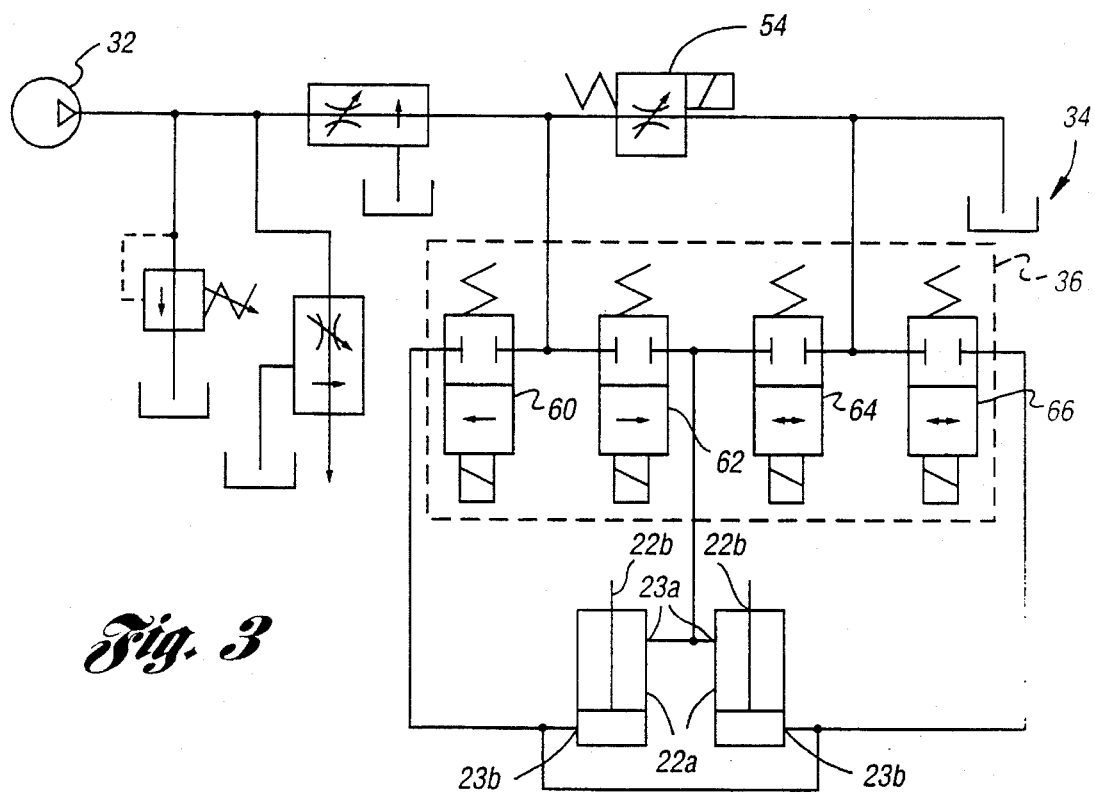
FIG. 3 is a fluid schematic of an alternative embodiment of the system for vehicle roll control of the present invention.

Referring next to FIG. 3, a fluid schematic of an alternative embodiment of the system (10) for vehicle roll control of the present invention is shown, wherein components first identified in FIGS. 1 and 2 have been assigned like reference numerals. As seen therein, the fluid circuit is again a part of the power steering system and comprises power steering fluid pump (32), pressure differential valve (54) and fluid reservoir (34). In this embodiment, however, fluid control device (36) comprises first, second, third and fourth solenoid activated, normally closed, two-position, two-way valves (60, 62, 64, 66). More specifically, valves (60, 62, 64, 66) each have a de-energized, normally closed position and an energized open position.

One side of both first valve (60) and second valve (62) is connected to the high pressure side of pressure differential valve (54). The remaining side of first valve (60) is connected to cylinders (22a) at ports (23b) on one side of pistons (22b), while the remaining side of second valve (62) is connected to cylinders (22a) at ports (23a) on the other side of pistons (22b). Similarly, one side of both third valve (64) and fourth valve (66) is connected to fluid reservoir (34). The remaining side of third valve (64) is connected to cylinders (22a) at ports (23a) on one side of pistons (22b), while the remaining side of fourth valve (66) is connected to cylinders (22a) at ports (23b) on the other side of pistons (22b).

In operation, when the vehicle is driven along a straight line path, the sensed roll of the vehicle body relative to the vehicle wheels is negligible, and pressure differential valve (54) is de-energized so that only a negligible pressure differential is set up thereacross. At the same time, first and second valves (60, 62) are de-energized, while third and fourth valves (64, 66) are energized in order to connect ports (23a, 23b) on both sides of pistons (22b) directly to fluid reservoir (34). As a result, the fluid pressure in cylinders (22a) on each side of pistons (22b) will approach an equilibrium substantially at the pressure of the fluid in fluid reservoir (34).

In such a fashion, as terrain irregularities are encountered by the vehicle, pistons (22b) passively "float" relative to cylinders (22a) and their associated anti-roll bars (20) (see FIG. 1). Thus, as the vehicle is driven along a straight line path, it is provided with fluidly neutral roll control that does not to interfere with the remaining portions of the vehicle suspension system working to isolate the vehicle body from terrain irregularities.

Still referring to FIG. 3, when the vehicle is driven along a curved path and roll of the vehicle body is sensed relative to the vehicle wheels, pressure differential valve (54) is energized in order to establish a pressure differential thereacross such that a relatively lower fluid pressure exists on that side of pressure differential valve (54) connected to fluid reservoir (34). As previously stated, the magnitude of the pressure differential established by pressure differential valve (54) is directly proportional to the severity of the degree of roll of the vehicle body sensed.

At the same time, depending upon the configuration of the roll control system (10) and the direction of the curved path along which the vehicle is driven, either first and third valves (60, 64) are energized while second and fourth valves (62, 66) are de-energized, or second and fourth valves (62, 66) are energized while first and third valves (60, 64) are de-energized. In that regard, one of the above two combinations of energized and de-energized valves (60, 62, 64, 66) is operative to input a torque to anti-roll bar (20) in opposition to handling induced torques so as to right the vehicle body relative to the vehicle wheels. Similarly, the other of the above two combinations of energized and de-energized valves (60, 62, 64, 66) is operative to input an opposite torque to anti-roll bar (20) in opposition to handling induced torques so as to right the vehicle body relative to the vehicle wheels.

For example, when first and third valves (60, 64) are de-energized and second and fourth valves (62, 66) are energized, high pressure fluid generated by pressure differential valve (54) flows into cylinders (22a) through ports (23a) thereby increasing fluid pressure on one side of pistons (22b). As a result, fluid is forced out of cylinders (22a) through ports (23b) into fluid reservoir (34). In such a fashion, depending upon the configuration of the roll control system (10) and the direction of the curved path along which the vehicle is driven, a torque is applied to anti-roll bar (20) in opposition to the cornering induced torque so as to right the vehicle body relative to the vehicle wheels.

When first and third valves (60, 64) are energized and second and fourth valves (62, 66) are de-energized, a similar but opposite result is reached. That is, if a clockwise torque is applied to anti-roll bar (20) when first and third valves (60, 64) are de-energized and second and fourth valves (62, 66) are energized, then a counter-clockwise torque is applied to anti-roll bar (20) when first and third valves (60, 64) are energized and second and fourth valves (62, 66) are de-energized. Similarly, if a counter-clockwise torque is applied to anti-roll bar (20) when first and third valves (60, 64) are energized and second and fourth valves (62, 66) are de-energized, then a clockwise torque is applied to anti-roll bar (20) when first and third valves (60, 64) are energized and second and fourth valves (62, 66) are de-energized.

The embodiment of the roll control system (10) of the present invention shown in FIG. 3 also provides an additional advantage, and is therefore preferred, over the embodiment shown in FIG. 2. More specifically, in the event of an electrical power failure, valves (60, 62, 64, 66) all shuttle to their de-energized, normally closed positions. With all valves (60, 62, 64, 66) in such positions, fluid in cylinders (22a) on both sides of pistons (22b) is locked in place at a fluidly locked position such that no flow thereof is permitted in any direction whatsoever.

In such a fashion, pistons (22b) are locked, or "firm," relative to cylinders (22a) and their associated anti-roll bars (20) (see FIG. 1). The vehicle is thus provided with fluidly locked roll control, or passive response, in the event of an electrical power failure. Finally, valves (60, 62, 64, 66) may also be designed, as is well known to those of ordinary skill in the are, so as to perform the fluid flow prevention and pressure relief functions of the check valve (56) and relief valve (58) described above with reference to FIG. 2.

Referring finally to FIG. 4, a block diagram of the method for vehicle roll control of the present invention is shown, designated generally by reference numeral 100. As seen therein, the method (100) of the present invention comprises sensing (102) roll of the vehicle, generating (104) a roll control signal in response to the sensed vehicle roll, generating (106) a high pressure fluid, and providing (108) an actuator for compensating for the sensed vehicle body roll, the actuator having a fluid inlet and a fluid outlet. The method (100) also comprises controlling (110) the actuator in response to the roll control signal to port both the actuator inlet and outlet to a fluid reservoir when the vehicle is driven along a straight line path, the fluid reservoir having a fluid pressure less than the high pressure fluid, and to port one of the actuator inlet and outlet to the fluid reservoir and the other of the actuator inlet and outlet to the high pressure fluid when the vehicle is driven along a curved path.

Generating (106) a high pressure fluid may itself comprise providing (112) a pressure differential valve, and maintaining (114) a substantially constant pressure differential across the pressure differential valve for a plurality of fluid flow rates. Similarly, controlling (110) the actuator may itself comprise providing (116) a solenoid activated three-position valve having a de-energized position, a first energized position and a second energized position, and selectively energizing (118) the valve in response to the roll control signal such that the de-energized position ports both the actuator inlet and outlet to the fluid reservoir, the first energized position ports the actuator inlet to the fluid reservoir and the outlet to the high pressure fluid, and the second energized position ports the actuator outlet to the fluid reservoir and the inlet to the high pressure fluid.

Alternatively, controlling (110) the actuator may comprise providing (120) a plurality of solenoid activated two-position valves each having a de-energized normally closed position and an energized open position, and selectively energizing (122) the plurality of valves in response to the roll control signal. Controlling (110) the actuator may also alternatively comprise providing (124) a first solenoid activated two-position valve in direct communication with the high pressure fluid and the actuator inlet, the first valve having a de-energized normally closed position and an energized open position, providing (126) a second solenoid activated two-position valve in direct communication with the high pressure fluid and the actuator outlet, the second valve having a de-energized normally closed position and an energized open position, providing (128) a third solenoid activated two-position valve in direct communication with the fluid reservoir and the actuator inlet, the third valve having a de-energized normally closed position and an energized open position, and providing (130) a fourth solenoid activated two-position valve in direct communication with the fluid reservoir and the actuator outlet, the fourth valve having a de-energized normally closed position and an energized open position.

In that regard, controlling (110) the actuator may further alternatively comprise energizing (132) the third and fourth valves to port both the actuator inlet and outlet to the fluid reservoir when the vehicle is driven along a straight line path, energizing (134) the first and third valves to port the actuator inlet to the high pressure fluid and the actuator outlet to the fluid reservoir, respectively, when the vehicle is driven along a first curved path. Controlling (110) the actuator may still further alternatively comprise energizing (136) the second and fourth valves to port the actuator outlet to the high pressure fluid and the actuator inlet to the fluid reservoir, respectively, when the vehicle is driven along a second curved path, and fluidly locking (138) both the actuator inlet and outlet in the event of an electrical power failure where the first, second, third and fourth valves are de-energized.

As is readily apparent from the foregoing detailed description, the present invention provides an improved roll control system (10) and method (100). In addition to compensating for vehicle roll during cornering, the present invention provides fluidly neutral, or "floating," roll control when the vehicle is driven along a straight line path so as not to interfere with the remaining portions of the vehicle suspension system. Moreover, the present invention provides fluidly locked, or "firm," roll control in the event of an electrical power failure.

The system (10) and method (100) for vehicle roll control of the present invention have been described and shown herein in conjunction with an ordinary, four-wheel passenger motor vehicle. However, it should be readily apparent that the system (10) and method (100) for vehicle roll control of the present invention are suitable for use in any application where vehicle roll control may be required.

It should be understood that the present invention has been described in an illustrative manner and the terminology which has been used is intended to be in the nature of words of description rather than of limitation. Obviously, many modifications and variations of the present invention are possible in light of the above teachings. Therefore, it should also be understood that, within the scope of the following claims, the invention may be practiced other than as specifically described.

We claim:

1. A roll control system for a vehicle, the system comprising:

means for sensing roll of the vehicle;

means for generating a roll control signal in response to the sensed vehicle roll;

an actuator for compensating for the sensed vehicle roll, the actuator having a fluid inlet and a fluid outlet;

a first solenoid activated two-position valve in direct communication with a fluid reservoir having fluid at a reservoir pressure and the actuator inlet, the first valve having a de-energized normally closed position and an energized open position; and a second solenoid activated two-position valve in direct communication with the fluid reservoir and the actuator outlet, the second valve having a de-energized normally closed position and an energized open position;

a third solenoid activated two-position valve in direct communication with a high pressure fluid and the actuator inlet, the high pressure fluid having a pressure greater than the reservoir pressure, the third valve having a de-energized normally closed position and an energized open position;

a fourth solenoid activated two-position valve in direct communication with the high pressure fluid and the actuator outlet, the fourth valve having a de-energized normally closed position and an energized open position;

wherein the first and second valves are energized to port both the actuator inlet and outlet to the fluid reservoir when the vehicle is driven along a straight line path, the first valve is energized to port the actuator inlet to the fluid reservoir and the fourth valve is energized to port the actuator outlet to the high pressure fluid when the vehicle is driven along a first curved path, the second valve is energized to port the actuator outlet to the fluid reservoir and the third valve is energized to port the actuator inlet to the high pressure fluid when the vehicle is driven along a second curved path, and both the actuator inlet and outlet are fluidly locked in the event of an electrical power failure where the first, second, third and fourth valves are de-energized.

2. The roll control system of claim 1 further comprising a pressure differential valve for generating the high pressure fluid.

3. The roll control system of claim 2 wherein the pressure differential valve maintains a substantially constant pressure differential thereacross for a plurality of fluid flow rates.

4. A roll control system for a vehicle, the system comprising:

means for sensing roll of the vehicle;
   means for generating a roll control signal in response to the sensed vehicle roll;
   a pressure differential valve for generating a high pressure fluid;
   an actuator for compensating for the sensed vehicle roll, the actuator having a fluid inlet and a fluid outlet; and
   a fluid control device for controlling the actuator in response to the roll control signal, the control device operative to port both the actuator inlet and outlet to a fluid reservoir when the vehicle is driven along a straight line path, the fluid reservoir having a fluid pressure less than the high pressure fluid, and to port one of the actuator inlet and outlet to the fluid reservoir and the other of the actuator inlet and outlet to the high pressure fluid when the vehicle is driven along a curved path, the fluid control device including a plurality of solenoid activated two-position valves each having a de-energized normally closed position and an energized open position, the plurality of solenoid activated two-position valves including
      a first valve in direct communication with the high pressure fluid and the actuator inlet,
      a second valve in direct communication with the high pressure fluid and the actuator outlet,
      a third valve in direct communication with the fluid reservoir and the actuator inlet, and
      a fourth valve in direct communication with the fluid reservoir and the actuator outlet;
   wherein, in response to the roll control signal, the third and fourth valves are energized to port both the actuator inlet and outlet to the fluid reservoir when the vehicle is driven along a straight line path, the first valve is energized to port the actuator inlet to the high pressure fluid and the third valve is energized to port the actuator outlet to the fluid reservoir when the vehicle is driven along a first curved path, the second valve is energized to port the actuator outlet to the high pressure fluid and the fourth valve is energized to port the actuator inlet to the fluid reservoir when the vehicle is driven along a second curved path, and both the actuator inlet and outlet are fluidly locked in the event of an electrical power failure where the first, second, third and fourth valves are de-energized.

5. A roll control method for a vehicle, the method comprising:

sensing roll of the vehicle;
   generating a roll control signal in response to the sensed vehicle roll;
   generating a high pressure fluid;
   providing an actuator for compensating for the sensed vehicle body roll, the actuator having a fluid inlet and a fluid outlet; and
   controlling the actuator in response to the roll control signal to port both the actuator inlet and outlet to a fluid reservoir when the vehicle is driven along a straight line path, the fluid reservoir having a fluid pressure less than the high pressure fluid, and to port one of the actuator inlet and outlet to the fluid reservoir and the other of the actuator inlet and outlet to the high pressure fluid when the vehicle is driven along a curved path, controlling the actuator including
      providing a first solenoid activated two-position valve in direct communication with the high pressure fluid and the actuator inlet, the first valve having a de-energized normally closed position and an energized open position,
      providing a second solenoid activated two-position valve in direct communication with the high pressure fluid and the actuator outlet, the second valve having a de-energized normally closed position and an energized open position,
      providing a third solenoid activated two-position valve in direct communication with the fluid reservoir and the actuator inlet, the third valve having a de-energized normally closed position and an energized open position,
      providing a fourth solenoid activated two-position valve in direct communication with the fluid reservoir and the actuator outlet, the fourth valve having a de-energized normally closed position and an energized open position,
      energizing the third and fourth valves to port both the actuator inlet and outlet to the fluid reservoir when the vehicle is driven along a straight line path,
      energizing the first and third valves to port the actuator inlet to the high pressure fluid and the actuator outlet to the fluid reservoir, respectively, when the vehicle is driven along a first curved path,
      energizing the second and fourth valves to port the actuator outlet to the high pressure fluid and the actuator inlet to the fluid reservoir, respectively, when the vehicle is driven along a second curved path, and
      fluidly isolating both the actuator inlet and outlet in the event of an electrical power failure where the first, second, third and fourth valves are de-energized.

* * * * *